United States Patent
Lee

(10) Patent No.: US 8,792,196 B1
(45) Date of Patent: Jul. 29, 2014

(54) DISK DRIVE ESTIMATING NOISE IN A READ SIGNAL BASED ON AN IDENTIFIED RESPONSE AT THE INPUT OF AN EQUALIZER

(71) Applicant: Western Digital Technologies, Inc., Irvine, CA (US)

(72) Inventor: Patrick J. Lee, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/789,226

(22) Filed: Mar. 7, 2013

(51) Int. Cl.
G11B 20/10 (2006.01)

(52) U.S. Cl.
USPC .......................................................... 360/39

(58) Field of Classification Search
CPC ................................................ G11B 20/10462
See application file for complete search history.

(56) References Cited

U.S. PATENT DOCUMENTS

| | | | |
|---|---|---|---|
| 5,786,951 | A | 7/1998 | Welland et al. |
| 6,731,443 | B2 | 5/2004 | Bliss et al. |
| 6,771,442 | B2 | 8/2004 | Bliss et al. |
| 6,856,183 | B2 * | 2/2005 | Annampedu ................ 327/159 |
| 7,185,269 | B2 | 2/2007 | Mar et al. |
| 7,372,651 | B2 | 5/2008 | Gunderson et al. |
| 7,411,534 | B1 | 8/2008 | Melanson |
| 7,424,074 | B2 | 9/2008 | Lee et al. |
| 7,440,208 | B1 | 10/2008 | McEwen et al. |
| 7,643,238 | B2 * | 1/2010 | DeGroat ........................ 360/65 |
| 7,760,821 | B2 | 7/2010 | Cherubini et al. |
| 7,898,756 | B1 | 3/2011 | Wang |
| 7,917,563 | B1 | 3/2011 | Shih et al. |
| 7,924,518 | B2 * | 4/2011 | Mathew et al. ................. 360/25 |
| 7,948,703 | B1 * | 5/2011 | Yang ............................... 360/68 |
| 7,990,648 | B1 | 8/2011 | Wang |
| 7,995,299 | B2 * | 8/2011 | Hayashi .......................... 360/31 |
| 8,149,529 | B2 * | 4/2012 | Mathew et al. ................. 360/46 |
| 2004/0156293 | A1 * | 8/2004 | Pozidis et al. ............. 369/59.22 |
| 2008/0007854 | A1 * | 1/2008 | Lin et al. ......................... 360/39 |
| 2008/0253438 | A1 * | 10/2008 | Riani et al. .................... 375/232 |
| 2011/0093517 | A1 | 4/2011 | Liu et al. |
| 2011/0110210 | A1 | 5/2011 | Honma |

OTHER PUBLICATIONS

Inkyu Lee, John M. Cioffi, "Design of Equalized Maximum-Likelihood Receiver", IEEE Communications Letters, vol. 2, No. 1, Jan. 1998, pp. 14-16.

(Continued)

*Primary Examiner* — Wayne Young
*Assistant Examiner* — Mark Fischer

(57) ABSTRACT

A disk drive is disclosed comprising a head actuated over a disk, and control circuitry comprising a read channel comprising an analog filter and an equalizer. Data is read from the disk to generate a read signal, and the analog filter filters the read signal. The filtered read signal is sampled, and the read signal samples are input into the equalizer in order to equalize the read signal samples according to a target response. A response of the read channel based on the read signal samples input into the equalizer is identified to generate an identified response. Expected samples are generated based on the identified response, wherein the expected samples correspond to the data written to the disk, and an estimated noise sequence is estimated based on the expected samples and the read signal samples.

10 Claims, 5 Drawing Sheets

(56) References Cited

OTHER PUBLICATIONS

Jaekyun Moon, Weining Zeng, "Equalization for Maximum Likelihood Detectors", IEEE Transactions on Magnetics, vol. 31, No. 2, Mar. 1995, pp. 1083-1088.

Wikipedia, "Similarities between Wiener and LMS", Feb. 4th, 2012, http://en.wikipedia.org/wiki/Similarities_between_Wiener_and_LMS.

Walt Kester, "ADC Input Noise: The Good, The Bad, and The Ugly. Is No Noise Good Noise?", Analog Dialogue 40-02, Feb. 2006.

* cited by examiner

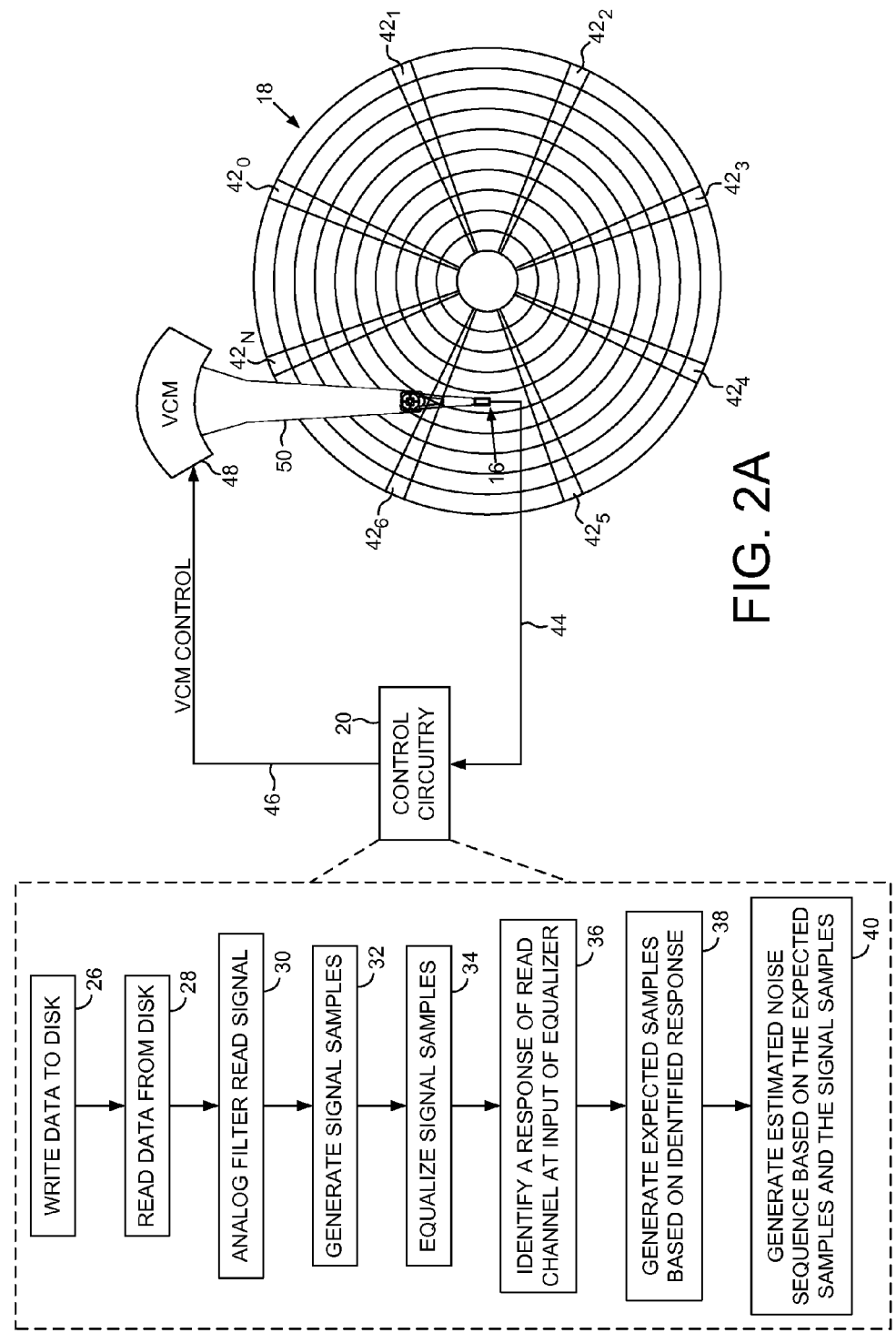

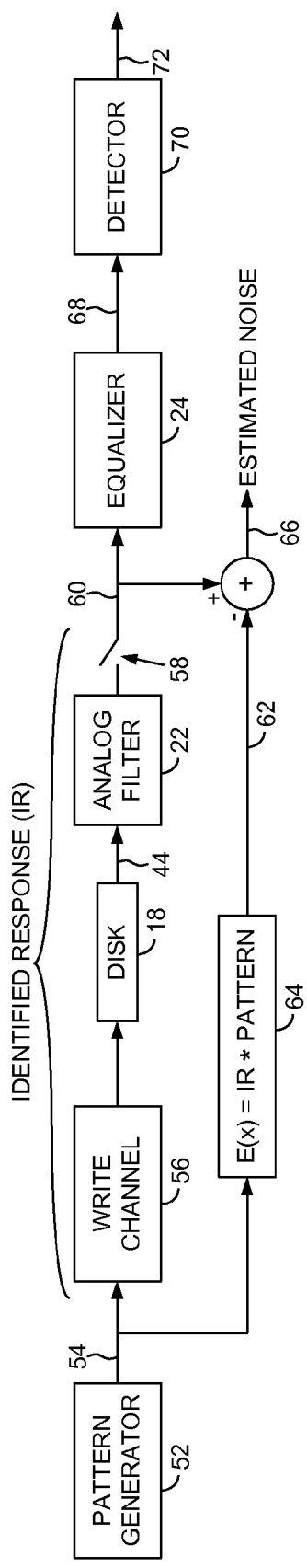
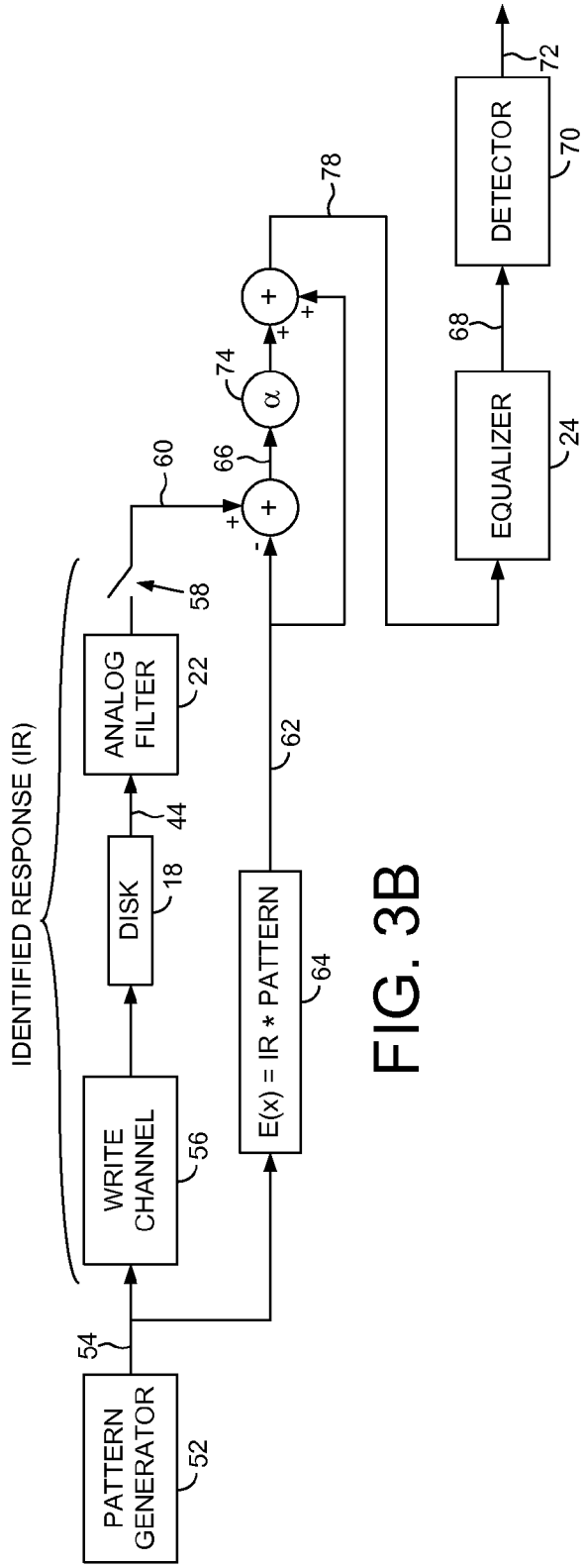
FIG. 3A
FIG. 3B

DISK DRIVE ESTIMATING NOISE IN A READ SIGNAL BASED ON AN IDENTIFIED RESPONSE AT THE INPUT OF AN EQUALIZER

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

Data is typically written to data sectors within a data track by modulating the write current of a write element, for example, using a non-return to zero (NRZ) signal, thereby writing magnetic transitions onto the disk surface. A read element (e.g., a magnetoresistive (MR) element) is then used to transduce the magnetic transitions into a read signal that is demodulated by a read channel. The recording and reproduction process may be considered a communication channel, wherein communication demodulation techniques may be employed to demodulate the read signal.

When reading data from the disk, a read channel typically samples the read signal to generate read signal samples that are equalized according to a target response (e.g., a partial response). A sequence detector (e.g., a Viterbi detector) detects an estimated data sequence from the equalized samples, and errors in the estimated data sequence are corrected, for example, using a Reed-Solomon error correction code (ECC) or using a Low Density Parity Check (LDPC) code.

It is typically desirable to measure the performance of the disk drive in terms of bit error rate in order to qualify each disk drive as acceptable and/or calibrate various parameters of each disk drive (e.g., by selecting a data density or calibrating read channel parameters). Since the bit error rate of a Reed-Solomon ECC or LDPC decoder is typically very low, the prior art has suggested to margin the read channel during the quality test and or calibration procedures by adding random noise to the read signal or enhancing random noise in the read signal.

BRIEF DESCRIPTION OF THE DRAWINGS

FIG. 2A shows a disk drive according to an embodiment comprising a head actuated over a disk, and control circuitry include a read channel.

FIG. 2B is a flow diagram according to an embodiment wherein a response of the read channel is identified at an input to an equalizer, and the identified response is used to generate an estimated noise sequence for the read signal.

FIG. 3A shows an embodiment wherein expected samples are generated by convolving a test pattern written to the disk with the identified response.

FIG. 3B shows an embodiment wherein the estimated noise sequence is amplified to generate an amplified noise sequence, the amplified noise sequence is added to the expected samples to generate noisy samples, and an estimated data sequence is detected from the noisy samples.

DETAILED DESCRIPTION

Figure 1:
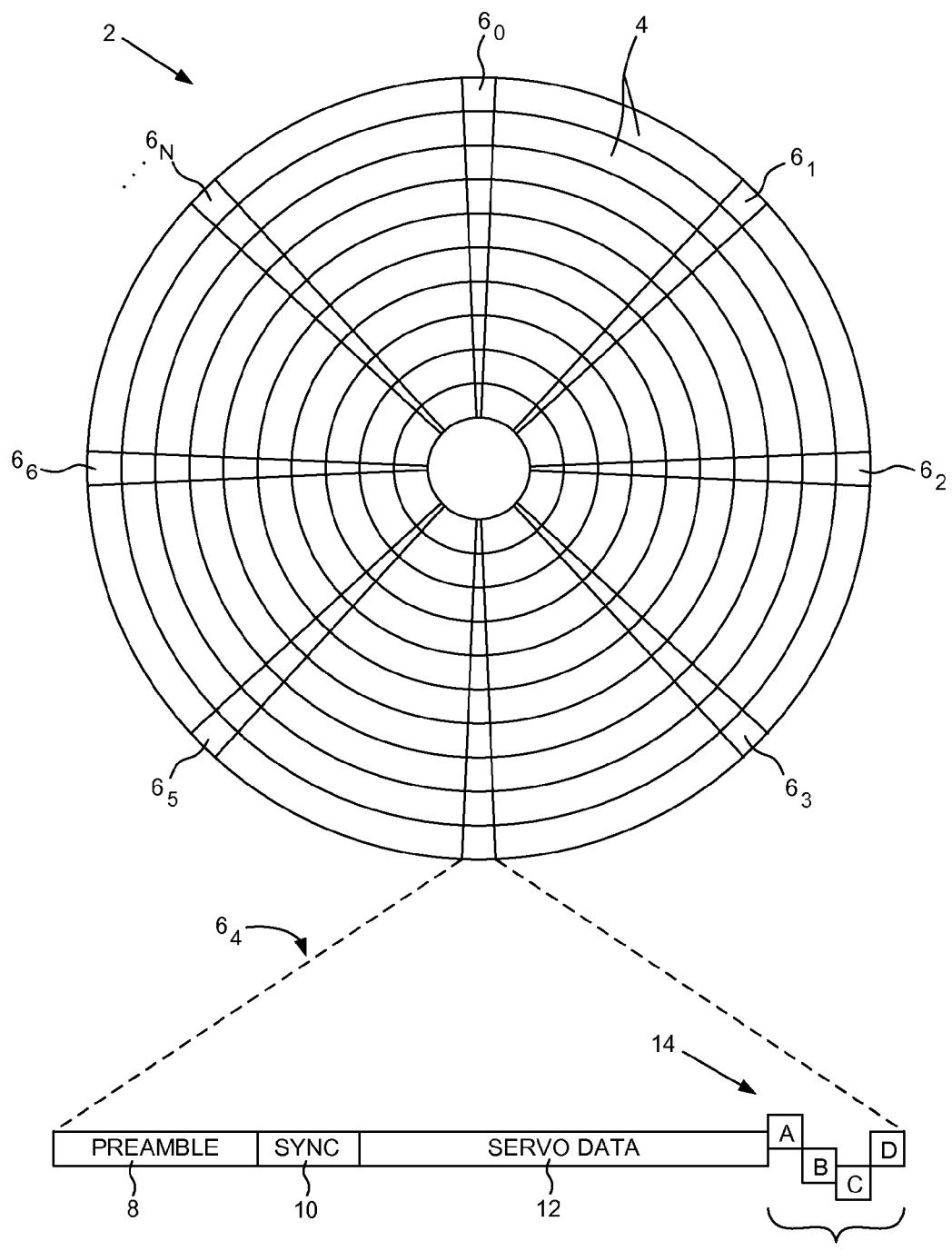
FIG. 1 shows a prior art disk format comprising a plurality of servo tracks defined by servo sectors.

FIG. 2A shows a disk drive according to an embodiment comprising a head 16 actuated over a disk 18, and control circuitry 20 comprising a read channel (e.g., FIG. 3A) comprising an analog filter 22 and an equalizer 24. The control circuitry 20 is operable to execute the flow diagram of FIG. 2B, wherein data is written to the disk (block 26), and then read from the disk to generate a read signal (block 28). The analog filter filters the read signal to generate a filtered read signal (block 30), and read signal samples are generated in response to the filtered read signal (block 32). The read signal samples are input into the equalizer in order to equalize the read signal samples according to a target response (block 34). A response of the read channel is identified based on the read signal samples input into the equalizer to generate an identified response (block 36). Expected samples are generated based on the identified response, wherein the expected samples correspond to the data written to the disk (block 38). An estimated noise sequence is generated based on the expected samples and the read signal samples (block 40).

In the embodiment of FIG. 2A, a plurality of concentric servo tracks are defined by embedded servo sectors $42_0$-$42_N$, wherein a plurality of concentric data tracks are defined relative to the servo tracks. The control circuitry 20 processes a read signal 44 emanating from the head 16 to demodulate the servo sectors and generate a position error signal (PES) representing an error between the actual position of the head and a target position relative to a target track. The control circuitry 20 filters the PES using a suitable compensation filter to generate a control signal 46 applied to a voice coil motor (VCM) 48 which rotates an actuator arm 50 about a pivot in order to actuate the head 16 radially over the disk 18 in a direction that reduces the PES. The servo sectors may comprise any suitable head position information, such as a track address for coarse positioning and servo bursts for fine positioning. The servo bursts may comprise any suitable pattern, such as an amplitude based servo pattern (FIG. 1) or a phase based servo pattern.

FIG. 3A shows control circuitry according to an embodiment wherein a pattern generator 52 generates a test pattern 54 that is written to the disk 18 through a suitable write channel 56. The read signal 44 is filtered by an analog filter 22, and the filtered read signal is sampled by a sampling device 58 to generate the read signal samples 60. Expected samples 62 corresponding to the read signal samples 60 are generated by convolving 64 the test pattern 54 with the identified response (IR). The estimated noise sequence 66 is generated based on a difference between the read signal samples 60 and the expected samples 62. In the embodiment of FIG. 3A, the read signal samples 60 are input into an equalizer 24 which equalizes the read signal samples 60 into equalized samples 68 based on a target response (e.g., a partial response). A suitable detector 70 (e.g., a trellis detector and/or iterative detector) processes the equalized samples 68 to detect an estimate data sequence 72.

The estimated noise sequence 66 may be used for any suitable purpose in various different embodiments. For example, the estimated noise sequence 66 may be evaluated to characterize and/or verify the quality of the recording channel, such as the quality of the magnetic media and/or the quality of the head 16. In another embodiment the estimated noise sequence 66 may be evaluated to detect defects on the disk 18 which may be mapped out. In yet another embodiment, the estimated noise sequence 66 may be used to amplify the noise in the read signal samples in order to evaluate the performance of the sequence detector 70, and/or calibrate parameters of the read channel, such calibrate coefficients of the equalizer 24 and/or calibrate parameters of the detector 70. This embodiment is understood with reference to FIG. 3B wherein the estimated noise sequence 66 is amplified 74, and the amplified noise sequence is added to the expected samples 62 to generate noisy samples 78. The detector 70 then detects the estimated data sequence 72 in response to the noisy samples 78 after being equalized by the equalizer 24. In one embodiment, the estimated data sequence 72 may be evaluated to calibrate and/or characterize the read channel, for example, by comparing the estimated data sequence 72 to the written test pattern 54 to determine an error rate of the read channel. In one embodiment, the parameters of the read channel may be calibrated to minimize the error rate, wherein amplifying the noise in the read signal samples 60 may help expedite this calibration process.

Figure 4:
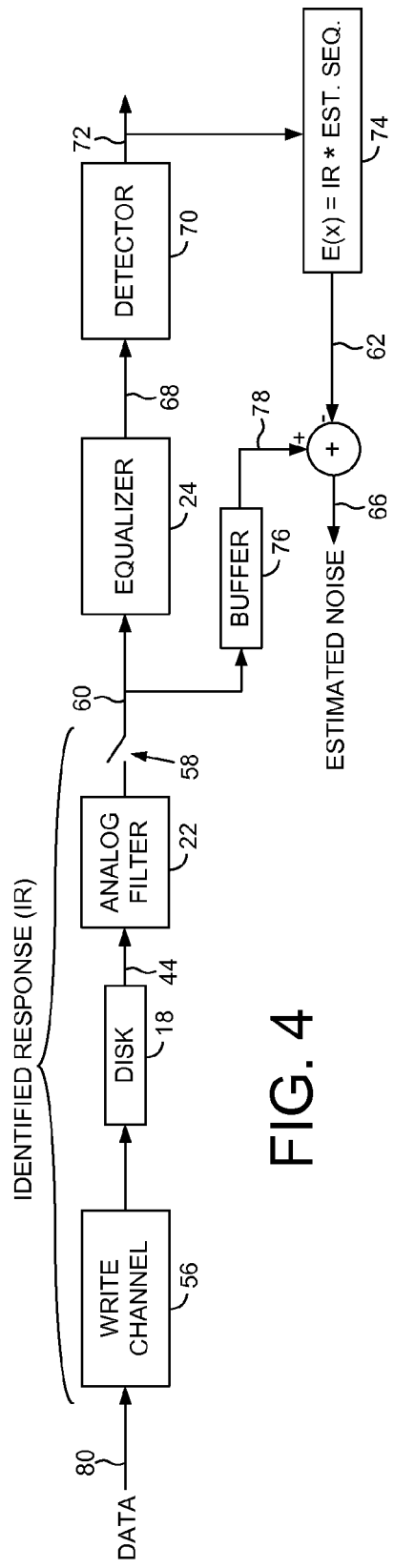
FIG. 4 shows an embodiment wherein expected samples are generated by convolving the estimated data sequence output by a sequence detector with the identified response.

FIG. 4 shows an embodiment wherein the expected samples 62 are generated by convolving 74 the estimated data sequence 72 output by the detector 70 with the identified response (IR). The read signal samples 60 are buffered 76 to account for the pipeline delay of the equalizer 24 and the detector 70, and the estimated noise sequence 66 is generated based on a difference between the buffered read signal samples 78 and the expected samples 62. In this embodiment, the data 80 written to the disk 18 may comprise a test pattern as described above, or the data may comprise user data or other data that is unknown at the time of the read operation. In one embodiment, the estimated noise sequence 66 may be used to recalibrate the parameters of the read channel over time while the disk drive is deployed in the field. In another embodiment, the estimated noise sequence 66 may be evaluated over time to predict when components of the disk drive may be failing, such as when a component of the head may be failing. In yet another embodiment, the estimated noise sequence 66 may be stored over time in a log, such as in a Self-Monitoring, Analysis and Reporting Technology (SMART) log which may be evaluated by a disk drive manufacturer in order to evaluate the historical performance of the disk drive, and/or improve component composition and fabrication techniques.

Figure 5A:
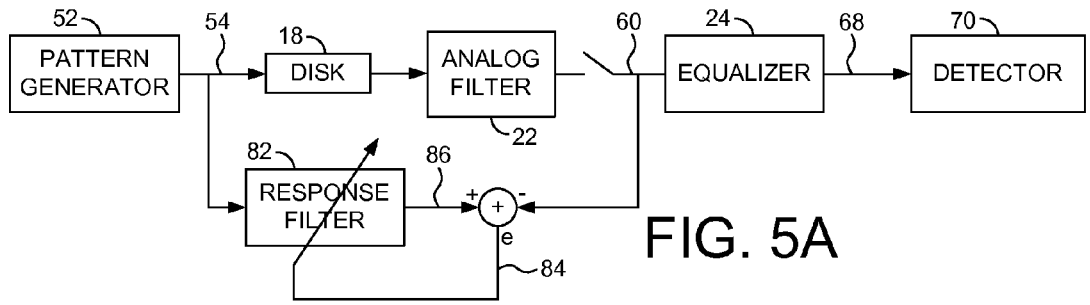
FIG. 5A shows an embodiment of the present invention wherein the response of the read channel is identified by adapting coefficients of a response filter.

Any suitable technique may be employed to identify the response of the read channel at the input of the equalizer 24. FIG. 5A shows an embodiment wherein the test pattern 54 generated by the pattern generator 52 is filtered by a response filter 82 implemented in any suitable manner, such as with a finite impulse response (FIR) filter. An error signal 84 is generated based on a difference between the output 86 of the response filter 82 and the read signal samples 60. The coefficients of the response filter 82 are adapted in response to the error signal 84, where the coefficients of the response filter 82 represent the identified response when the error signal 84 falls below a threshold. That is, when the response filter 82 has adapted to substantially match the response of the read channel at the input to the equalizer 24, the error between the read signal samples 60 and the output 86 of the response filter 82 will be substantially zero (or sufficiently small).

In one embodiment, the coefficients of the response filter 82 are adapted according to:

$$\frac{\partial}{\partial \hat{h}_i} \sum_n (x[n] - \hat{x}[n])^2$$

where $\hat{h}_i$ represents the coefficients of the response filter, $x[n]$ represents the read signal samples 60, and $\hat{x}[n]$ represents the output 86 of the response filter 82. The coefficients of the response filter are adapted until the above equation reaches a minimum. In one embodiment, the solution to the above equation can be derived using a Weiner filter solution for $n=-\infty$ to $+\infty$. In another embodiment, the Wiener filter solution can be simplified to a least mean squares (LMS) solution by considering only the error $e[n]$ for the current signal sample such that the coefficients of the response filter may be updated according to:

$$\hat{h}_i[n+1] = \hat{h}_i[n] + 2\mu(e[n])(s[n-i])$$

where $e[n]$ represents the error signal 84, $s[n-i]$ represents the test pattern 54, and $\mu$ is a step size.

Figure 5B:
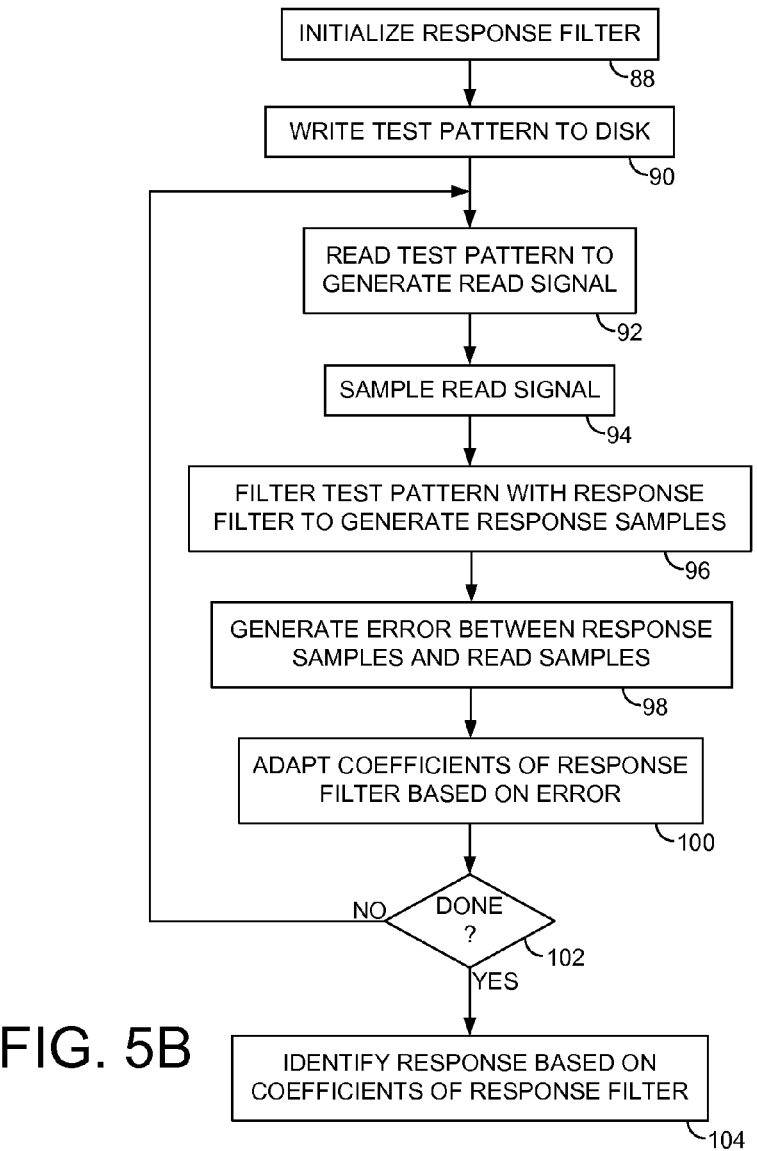
FIG. 5B is a flow diagram according to an embodiment for adapting the coefficients of the response filter based on an error signal generated as the difference between the read signal samples and the output of the response filter.

FIG. 5B is a flow diagram according to an embodiment wherein the coefficients of the response filter 82 are initialized to a nominal response (block 88). After writing the test pattern to the disk (block 90), and reading the test pattern (block 92), the read signal is sampled to generate the read signal samples (block 94). The test pattern is filtered with the response filter to generate response samples (block 96), and an error signal is generated as the difference between the response samples and the read signal samples (block 98). The coefficients of the response filter are adapted in a manner that minimizes the error signal, such as by using the algorithm described above (block 100). The process is then repeated starting from block 92 until any suitable criteria has been satisfied at block 102, such as when the error signal falls below a threshold or reaches a minimum. The response of the read channel at the input to the equalizer is then identified based on the adapted coefficients of the response filter.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

As will be apparent, many variations on the systems and methods described above are possible. For example, while the above disclosure has described processes as performed for "each" sector, zone or other disk portion, in some cases, the processes may be performed for only one or some of the disk portions and not necessarily for each of the disk portions.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk;
   a head actuated over the disk; and
   control circuitry comprising a read channel comprising an analog filter and an equalizer, the control circuitry operable to:
      write data to the disk;
      read the data from the disk to generate a read signal, wherein the analog filter is operable to filter the read signal to generate a filtered read signal;
      generate read signal samples in response to the filtered read signal, wherein the read signal samples are input into the equalizer in order to equalize the read signal samples into equalized samples according to a target response;
      identify a response of the read channel based on the read signal samples input into the equalizer to generate an identified response;
      generate expected samples based on the identified response, wherein the expected samples correspond to the data written to the disk; and
      generate an estimated noise sequence based on the expected samples and the read signal samples.

2. The disk drive as recited in claim 1, wherein:
   the data written to the disk comprises a test pattern; and
   the control circuitry is operable to generate the expected samples by convolving the test pattern with the identified response.

3. The disk drive as recited in claim 1, wherein the control circuitry is further operable to:
   detect an estimated data sequence in response to the equalized samples; and
   generate the expected samples by convolving the estimated data sequence with the identified response.

4. The disk drive as recited in claim 1, wherein the control circuitry is operable to generate the estimated noise sequence based on a difference between the expected samples and the read signal samples.

5. The disk drive as recited in claim 1, wherein the control circuitry is further operable to:
   amplify the estimated noise sequence to generate an amplified noise sequence;
   add the amplified noise sequence to the expected samples to generate noisy samples; and
   detect an estimated data sequence in response to the noisy samples.

6. A method of operating a disk drive comprising a head actuated over a disk, and control circuitry comprising a read channel comprising an analog filter and an equalizer, the method comprising:
   writing data to the disk;
   reading the data from the disk to generate a read signal;
   filtering the read signal with the analog filter to generate a filtered read signal;
   generating read signal samples in response to the filtered read signal, wherein the read signal samples are input into the equalizer in order to equalize the read signal samples into equalized samples according to a target response;
   identifying a response of the read channel based on the read signal samples input into the equalizer to generate an identified response;
   generating expected samples based on the identified response, wherein the expected samples correspond to the data written to the disk; and
   generating an estimated noise sequence based on the expected samples and the read signal samples.

7. The method as recited in claim 6, wherein:
   the data written to the disk comprises a test pattern; and
   the control circuitry is operable to generate the expected samples by convolving the test pattern with the identified response.

8. The method as recited in claim 6, further comprising:
   detecting an estimated data sequence in response to the equalized samples; and
   generating the expected samples by convolving the estimated data sequence with the identified response.

9. The method as recited in claim 6, further comprising generating the estimated noise sequence based on a difference between the expected samples and the read signal samples.

10. The method as recited in claim 6, further comprising:
   amplifying the estimated noise sequence to generate an amplified noise sequence;
   adding the amplified noise sequence to the expected samples to generate noisy samples; and
   detecting an estimated data sequence in response to the noisy samples.

* * * * *